(12) United States Patent
Lewis et al.

(10) Patent No.: US 6,345,254 B1
(45) Date of Patent: Feb. 5, 2002

(54) METHOD AND APPARATUS FOR IMPROVING SPEECH COMMAND RECOGNITION ACCURACY USING EVENT-BASED CONSTRAINTS

(75) Inventors: James R. Lewis, Delray Beach, FL (US); Kerry A. Ortega, Raleigh, NC (US); Ronald E. Van Buskirk, Indiantown, FL (US); Huifang Wang; Amado Nassiff, both of Boynton Beach, FL (US); Barbara E. Ballard, Kansas City, MO (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/321,918

(22) Filed: May 29, 1999

(51) Int. Cl.[7] ............................................. G10L 15/22
(52) U.S. Cl. ..................... 704/275; 704/255; 704/257
(58) Field of Search ................... 704/270, 200, 704/272, 275, 231, 239, 240, 250, 255, 256, 257

(56) References Cited

U.S. PATENT DOCUMENTS

| 5,027,406 A | * | 6/1991 | Roberts et al. | ............. 704/251 |
| 5,465,317 A | * | 11/1995 | Epstein | ....................... 704/236 |
| 5,664,061 A | * | 9/1997 | Andreshak et al. | ......... 704/275 |

* cited by examiner

*Primary Examiner*—Richemond Dorvil
(74) *Attorney, Agent, or Firm*—Akerman Senterfitt

(57) ABSTRACT

A method and system for improving the speech command recognition accuracy of a computer speech recognition system uses event-based constraints to recognize a spoken command. The constraints are system states and events, which include system activities, active applications, prior commands and an event queue. The method and system is performed by monitoring events and states of the computer system and receiving a processed command corresponding to the spoken command. The processed command is statistically analyzed in light of the system events and states as well as according to an acoustic model. The system then identifies a recognized command corresponding to the spoken command.

11 Claims, 4 Drawing Sheets

METHOD AND APPARATUS FOR IMPROVING SPEECH COMMAND RECOGNITION ACCURACY USING EVENT-BASED CONSTRAINTS

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition computer applications, and more specifically, to a system for improving the command recognition accuracy of a speech recognition system.

2. Description of the Related Art

Speech recognition is the process by which acoustic signals, received via a microphone, are converted into words by a computer. Once recognized, the words may be used in a variety of computer software applications for purposes such as document preparation, data entry and command and control. Speech recognition is generally a difficult problem due to the wide variety of pronunciations, accents and speech characteristics of individual speakers. Consequently, sets of constraints are used to make decisions about the words a user spoke.

Typical speech dictation recognition systems use two sets of constraints, namely, an acoustic model and a language model. The acoustic model considers the sounds that make up the words and the language model considers the grammatical context in which the words are used. These models are often used to help reduce the search space of possible words and to resolve ambiguities as between similar sounding words. Such models tend to be statistically-based systems and can be provided in a variety of forms. The simplest language model, for example, can be specified as a finite state network, where the permissible words following each word are given explicitly. However, more sophisticated language models have also been developed which are specified in terms of a context-specified grammar.

When using a speech recognition system to control system and software application operation and navigation, a set of commands is formulated for specific tasks and functions. Each command is typically one or two words or a short phase representing a common expression for performing a given operation. Typical speech command recognition systems can have a large number of such commands. So that the speaker does not have to memorize the precise phrasing of the commands, sophisticated systems also recognize alternate expressions having the same meaning as a known command. Typically, language models, as used for dictation recognition, are employed to constrain the spoken commands syntactically.

However, because the commands, and their synonymous counter-parts, are typically one or two words, syntax language models are often ineffective. Thus, conventional speech recognition systems rely heavily on acoustic models to select one of a set of commands, and as a result, they have difficultly recognizing the spoken commands. For example, if the spoken command sounds similar to other commands, the command recognition system may execute an unintended command, or the recognition system may not execute any command at all. In either case, the speaker will have to re-dictate the command or enter it with another input device.

Accordingly, it would be desirable to provide a system for improving the recognition accuracy of spoken commands for controlling system and application operation.

SUMMARY OF THE INVENTION

The present inventors have determined that the context in which a spoken command is executed can be utilized as a surrogate for the language models used for dictation recognition. In particular, event-based data structures, indicative of the context in which the command is given, are used as constraints in the recognition process. Thus, the present invention provides a system for improving command recognition accuracy of speech recognition systems.

Specifically, the present invention operates in a computer system for speech recognition operating at various states and running a program to perform various events. The method and system is performed by monitoring the events and states and receiving a processed command corresponding to a spoken command. The processed command is analyzed according to one or more acoustic models to identify a probable acoustic match. Likewise, the command is analyzed according to at least one of the events and states to identify a probable context match. Based upon the probable acoustic and context matches, the system provides a recognized command.

The present invention provides the object and advantage of accurately recognizing spoken system and application control commands. The present invention provides accurate speech command recognition even if the spoken command is only a single word.

The states and events can include system control activity, active applications, prior commands and an event queue. Thus, the present invention provides an additional object and advantage in that the one or more context constraining parameters exist on, or can be performed by, the computer system without the need for the speech recognition system to supply additional data and utilize storage space or computer memory.

The analysis of the system states and events to identify the probable context match can be accomplished using a statistical modeling technique. And, past events and states can be used to modify the statistical model. Thus, the present invention affords the further object and advantage of providing a statistical model tailored to the command choices of a given speaker or set of speakers using the system.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE DRAWINGS

There are shown in the drawings embodiments which are presently preferred, it being understood, however, that the invention is not so limited to the precise arrangements and instrumentalities shown, wherein.

DETAILED DESCRIPTION OF THE PREFERRED EMBODIMENT

Figure 1:
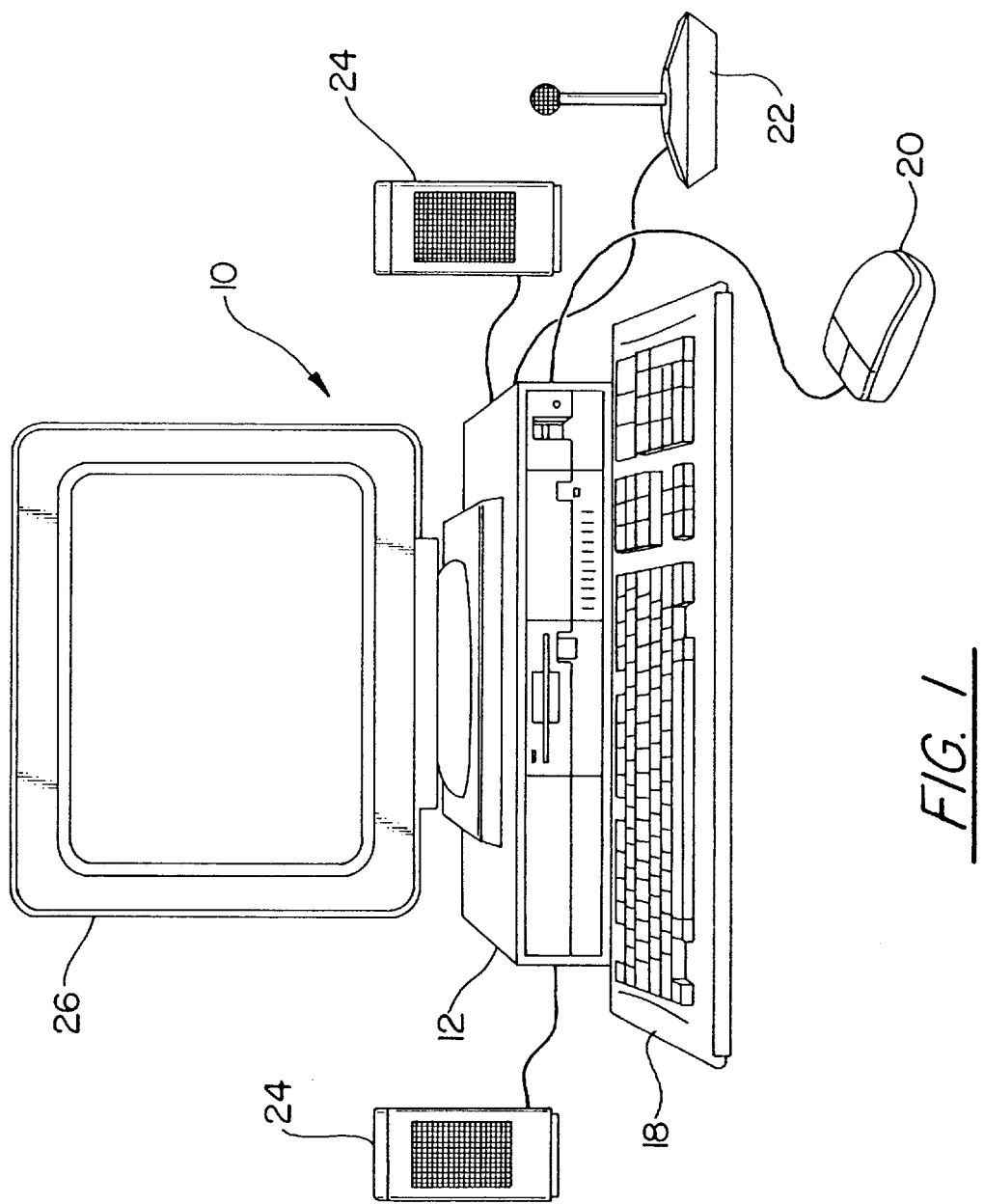
FIG. 1 shows a computer system for speech recognition with which the method and system of the present invention may be used.

Referring to the drawings in detail, wherein like reference characters represent corresponding elements throughout the several views, more specifically referring to FIG. 1, a computer system with which the present invention may be practiced is referred to generally by reference number 10. The computer system 10 is preferably comprised of a computer 12 having a central processing unit 14 (FIG. 2), at least one memory device 16 and related electronic circuitry (not shown). The computer system 10 also includes user input devices, a keyboard 18 and a pointing device 20, a microphone 22, audio loud speakers 24, and a video display 26, all of which are operatively connected to the computer 10 via suitable interface circuitry. The pointing device 20 and loud speakers 24 may be a part of the computer system 10, but are not required for the operation of the invention.

Generally, the computer system 10, as described above, can be satisfied by any one of many high speed multi-media personal computers commercially available from manufacturers such as International Business Machines Corporation, Compaq, Hewlett Packard, or Apple Computers. The memory devices 16 preferably include an electronic random access memory module and a bulk storage device, such as a magnetic disk drive. The central processing unit 14 may be any suitable processing chip, such as any of the Pentium family microprocessing chips commercially available from Intel Corporation.

Figure 2:
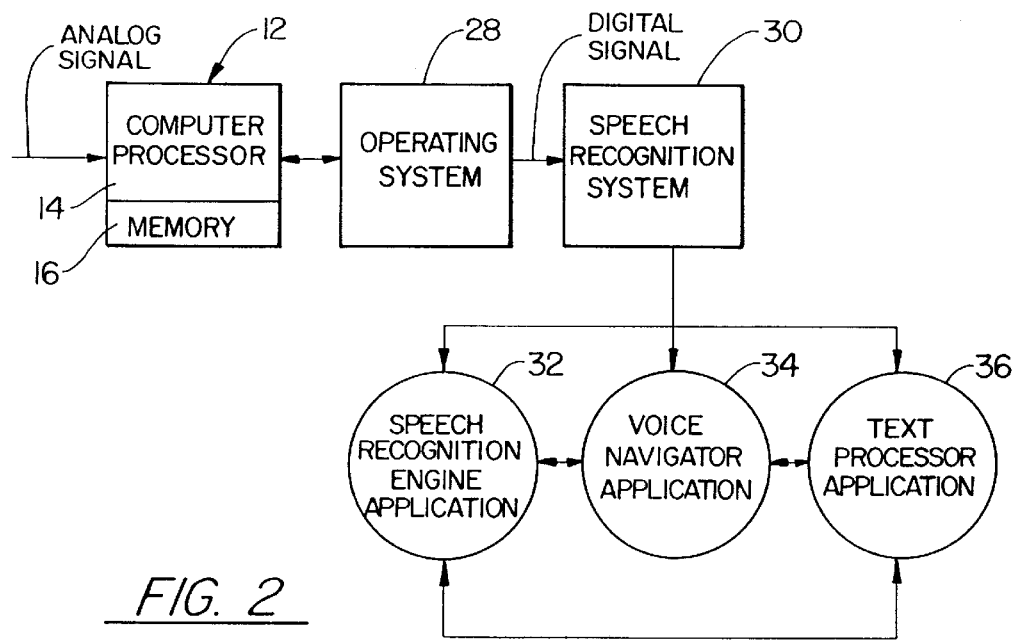
FIG. 2 is a block diagram showing a typical architecture for the computer system of FIG. 1 having a speech recognition engine.

Referring to FIG. 2, which illustrates a typical architecture for a computer system 10 having a speech recognition system, the system includes an operating system 28 and a speech recognition system 30. The speech recognition system 30 includes a speech recognition engine application 32 and a voice navigation application 34. A speech text processor application 36 may also be included.

In FIG. 2, the speech recognition engine 32, voice navigator 34 and text processor 36 are shown as separate application programs. It should be noted, however, that the invention is not limited in this regard, and these applications could be implemented as a single, more complex application. Also, the system 30 may be modified to operate without the text processor application 36, if the speech recognition system 30 is to be used solely for command and control.

In a preferred embodiment, the operating system 28 is one of the Windows family of operating systems, such as Windows NT, Windows '95 or Windows '98, which are available from Microsoft Corporation of Redmond, Wash. The present invention is not limited in this regard, however, as it may also be used with any other type of computer operating system.

Referring still to FIG. 2, in general, an analog audio signal containing speech commands is received by the microphone 22 and processed within the computer 12 by conventional audio circuitry, having an analog to digital convertor, which produces a digitized form of the signal. The operating system 28 transfers the digital command signal to the speech recognition system 30, where the command is recognized by the speech recognition engine 32 (as described below). The recognized command is then sent as a text phrase to an application, such as the voice navigator application 34, to perform the control function.

Figure 3:
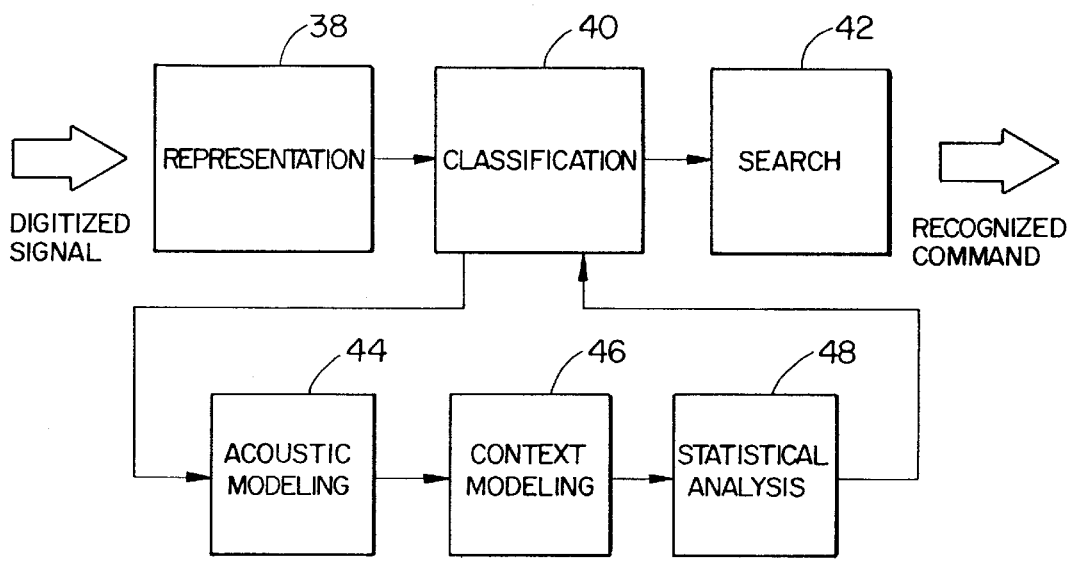
FIG. 3 is a block diagram showing the architecture for a speech recognition engine, including the present invention.

Referring now to FIG. 3, in greater detail, the speech recognition engine 32 receives a digital speech command signal from the operating system 28. The digital signal is subsequently transformed in representation block 38 into a useful set of data by sampling the digital signal at some fixed rate, typically every 10–20 milliseconds. Block 38 produces a new representation of the audio signal, which can then be used in subsequent stages of the speech command recognition process to determine the probability that the portion of an analyzed wave form corresponds to a particular phonetic event. This process is intended to emphasize perceptually important speaker independent features of the digitized speech command signal received from the operating system 28. In classification block 40, the processed speech command signal is used to identify, from the entire set of control commands, a subset of probable commands corresponding to the digitized speech command (as described in detail below). This subset of probable commands is searched at block 42 to obtain the recognized command. Once the command is recognized, it is used to execute the corresponding system or application function.

Referring still to FIG. 3, classification block 40 is performed by acoustic modeling block 44, context modeling block 46 and statistical analysis block 48. At acoustic modeling block 44, known algorithms process the speech command signal to adapt speaker-independent acoustic models, contained in memory 16, to the acoustic signal of the current speaker and identify one or more probable matching commands. At block 46, additional algorithms process the command signal according to the current state of the computer system as well as context events occurring prior to or contemporaneously with the spoken command. At block 48, the system states and events are preferably statistically analyzed, using known statistical modeling techniques, to identify one or more probable commands matching the context in which the command was given. Block 46 may be executed independent of the acoustic modeling 44 or performed following the acoustic modeling to further constrain the probable acoustic matches.

Figure 4:
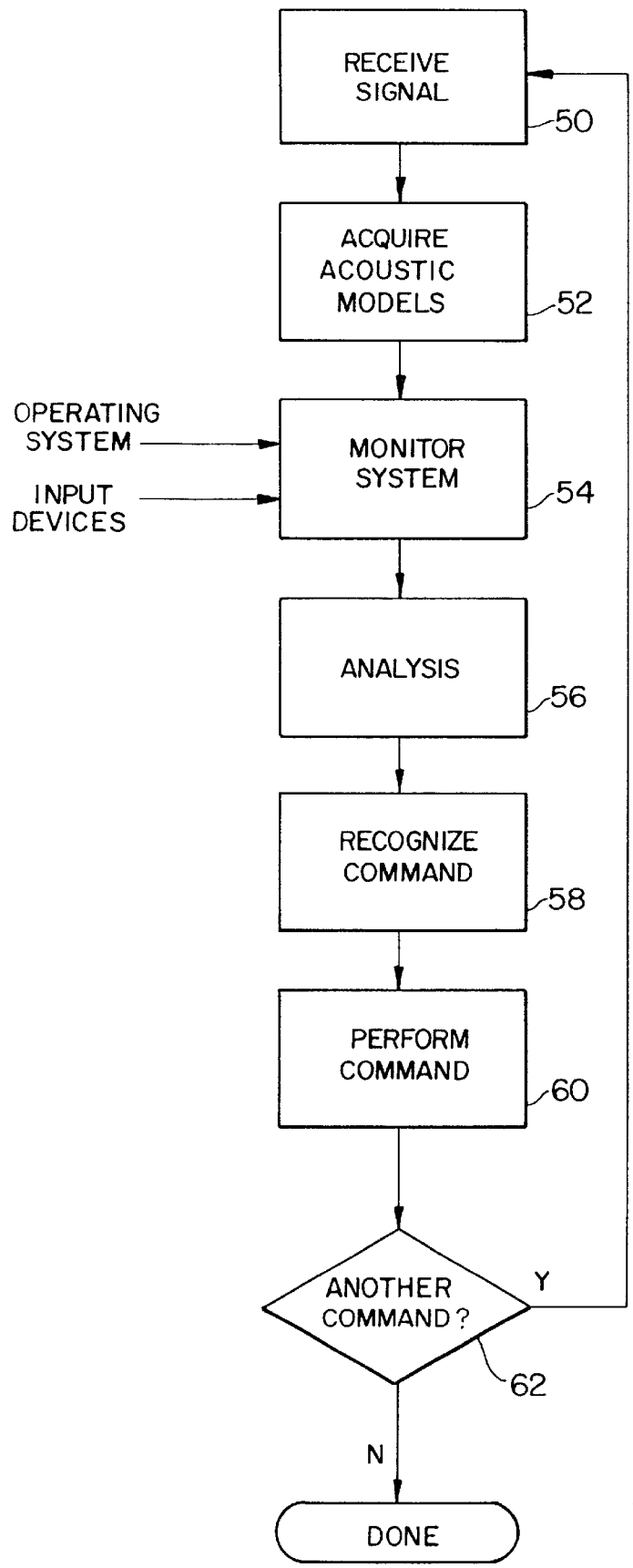
FIG. 4 is a flow chart illustrating a process for recognizing spoken commands according to the present invention.

Referring now to FIG. 4, the process for recognizing spoken commands begins at step 50 where the speech recognition engine 32 obtains the digitized command signal from the operating system 28. At step 52, the speech recognition engine 32 acquires acoustic models from memory 16. Then, at step 54, computer system 10 is monitored to discern the current state of the system as well as system or application events executed prior to or contemporaneously with the spoken command. The state and event data may be logged in the random access memory or in a history file stored in the bulk storage device, and called up during the command recognition process. Or, the system state and events may be checked once, or sampled at a fixed rate, during the recognition process without saving to memory. Either way, the states and events themselves supply the data for the context analysis, and therefore, the speech recognition system of the present invention does not require storing large context data files.

In particular, the speech recognition engine 32 acquires data pertaining to system activity, active applications, prior commands, and an event queue. Specifically, these data structures include activities such as: user inputs from voice or a mouse, stylus or keyboard; operation of drop-down menus or buttons; the activation of applications or applets within an application; prior commands; and idle events, i.e., when no activity is logged in an event queue for a prescribed time period. These system state and events, the prior commands in particular, can be tracked and used by the speaker or the system to create new or truncated speech commands based on the frequency in which certain command combinations are used. This data may also be used on an on-going basis to update the statistical model, so that it can be adapted to a specific user's command choice pattern.

Referring still to FIG. 4, at step 56, the audio signal is acoustically modeled and the context data is statistically analyzed to identify respective probable acoustic and context matches, as described above. Based on these matches, at step 58, a command is "recognized" which corresponds to the spoken command. At step 60, the speech recognition engine 32 communicates with the operating system 28 or an application, such as the voice navigator 34, to perform the recognized command. The system then checks for an additional command signal at step 62. If there is an additional command, the speech recognition engine 32 receives the signal and the above process is repeated otherwise, the routine is halted.

Figure 5:
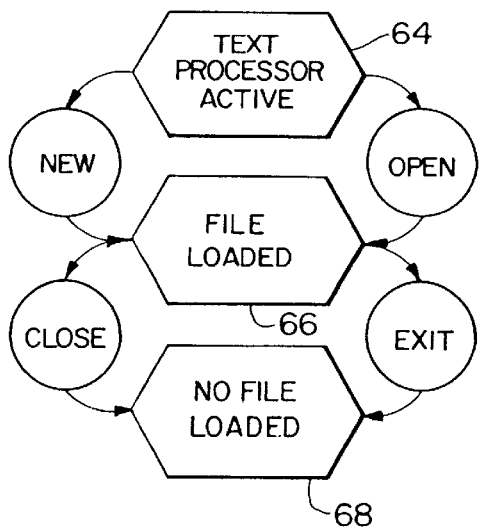
FIG. 5 shows exemplary system states and events that may be used in practicing the present invention.

By way of illustration, the present invention may be performed using the sample finite network of states and events illustrated in FIG. 5. In this case, the network begins at state 64 with the computer system having a text processor application active. At this state, since no text file is loaded, a set of events includes the commands: "new" and "open". Performing one of these events causes the system to be at a "file loaded" state 66, at which, the events "close" or "exit" may be performed to place the system at a "no file loaded" state 68.

Figure 6:
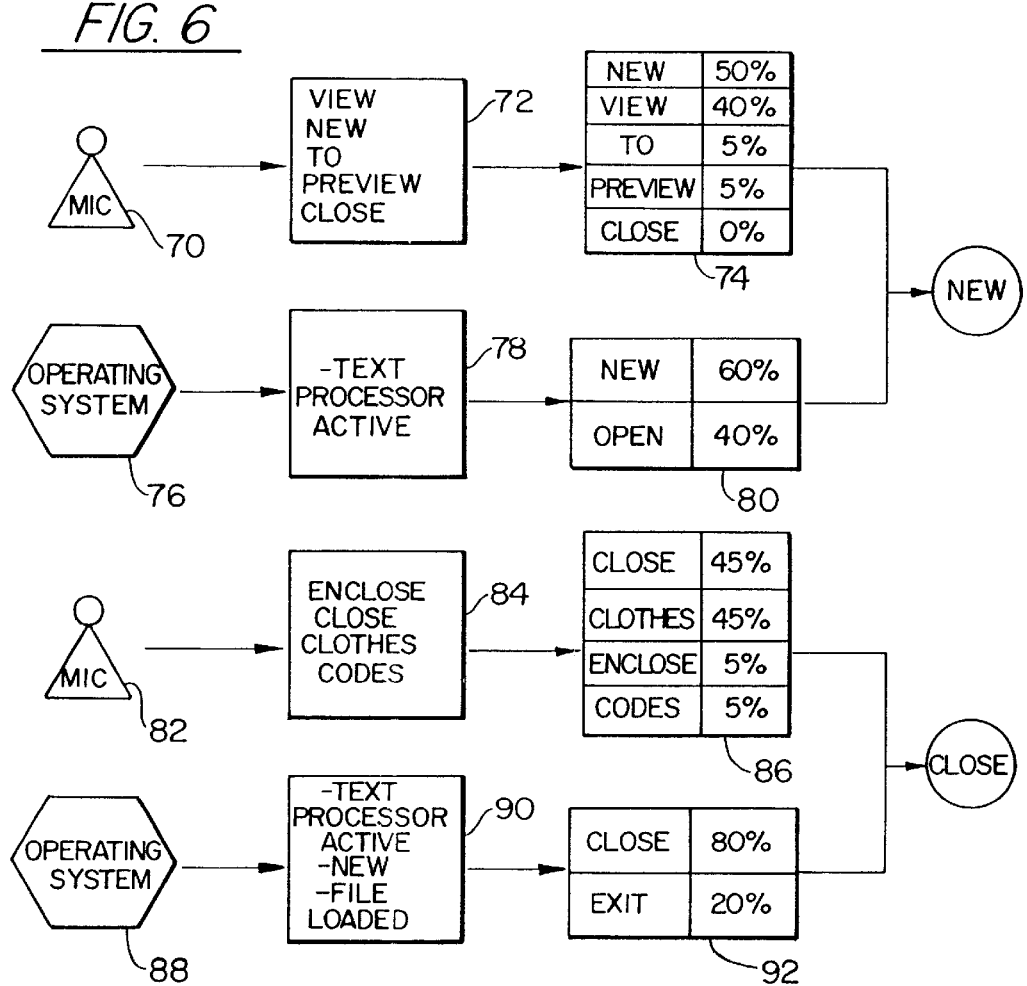
FIG. 6 shows the process of recognizing spoken commands according to the present invention for the exemplary system states and events of FIG. 5.

Referring now to FIG. 6 which illustrates a sample recognition process using the contextual system states and events of FIG. 5, at block 70, a speaker utters a "new" file command which is received via the microphone 22. At block 72, an acoustic model is acquired, which in this case is a finite set of words. At block 74, the spoken command is acoustically modeled and recognition values or weights are assigned to each command in the acoustic model set. The highest weighted word, here "new" at 50%, is identified as the most probable acoustic match. Also, the computer operating system 28 is monitored for current and prior system states and events, at block 76. In this case, as shown in block 78, this includes only the "text processor active" state. At block 80, the spoken command is statistically analyzed, here according to a finite set of commands weighted according to the statistical probability of their corresponding events occurring at the given state. The highest weighted command, "new" at 60%, is identified as the most probable context match. At this point, both models match the spoken command to the "new" command, which the speech recognition selects as the spoken command.

Referring still to FIG. 6, the "new" file command is then executed and the system moves to the "file loaded" state 66. Now, the speaker utters a "close" file command which is received via the microphone 22, at block 82. Note that since conventional speech recognition systems perform both speech dictation and command and control functions, the acoustic models contain terms other than commands, such as "clothes" in this example. At block 84, another acoustic model is acquired, which again is a finite set of commands. At block 84, the spoken command is acoustically modeled and recognition values or weights are assigned to each command in the acoustic model set to identify a probable acoustic match. Again, the computer operating system 28 is monitored for the current and prior system states and events, at block 88, which now includes the states of "text processor active" and "file loaded" as well as the "new" file event, as shown in block 90. At block 92, the spoken command is statistically analyzed, again according to a finite set of weighted commands and a probable context match is identified. Now, according to the acoustic modeling, two words: "close" and "clothes" are equally likely to be the spoken command. However, according to the analysis of the states and events, the matching command is "close". Thus, the system recognizes and executes the file "close" command.

In the event the acoustic modeling and context analysis provide different terms as probable matches, the acoustic match and the context match can each be weighted to establish which one governs.

While the foregoing specification illustrates and describes the preferred embodiments of the invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

We claim:

1. In a computer system for speech recognition operating at various states and running a program to perform various events, a method for recognizing a spoken command, comprising the steps of:

monitoring at least one of said events and states;

receiving a processed command corresponding to said spoken command;

analyzing said processed command according to at least one acoustic model to identify a probable acoustic match;

analyzing said processed command to identify a probable context match using a statistical model to analyze at least one of said events and states; and providing a recognized command based on said probable acoustic and statistical context matches.

2. The method according to claim 1, wherein said events include at least one of a system control activity, an active application, prior command and an event queue.

3. The method according to claim 1, wherein past events and states are used to modify said statistical model according to a particular user's command choice pattern.

4. In a computer system for speech recognition, a method for improving the accuracy by which a spoken command is recognized, comprising the steps of:

monitoring system events;

predicting a next event according to said system events using a statistical model to analyze said system events; and estimating said spoken commands according to said next event.

5. The method according to claim 4, wherein said system events include at least one of a system control activity, an active application, a prior command and an event queue.

6. The method according to claim 4, wherein past system events are used to modify said statistical model according to a particular user's command choice pattern.

7. The method according to claim 4, further comprising the step of receiving a processed command corresponding to said spoken command, wherein said predicting step further includes analyzing said processed command according to one or more acoustic models and said estimating step further includes identifying a probable command according to said one or more acoustic models.

8. A system for recognizing a spoken command, comprising:

means for monitoring at least one of system events and states;

means for receiving a processed command corresponding to said spoken command;

means for analyzing said processed command according to at least one acoustic model so as to identify a probable acoustic match and according to a statistical model acoustic for analyzing at least one of said events and states so as to identify a probate context match; and means for providing a recognized command based on said probable acoustic and statistical context matches.

9. The system as recited in claim 8, wherein said events include at least one of a system control activity, an active application, a prior command and an event queue.

10. The system as recited in claim 8, wherein past events and states are used to modify said statistical model according to a particular user's command choice pattern.

11. A machine readable storage, having stored thereon a computer program having a plurality of code sections executable by a machine for causing the machine to perform the steps of:

monitoring system events and states;

receiving a processed command corresponding to a spoken command;

analyzing said processed command according to at least one acoustic model to identify a probable acoustic match;

analyzing said processed command to identify a probable context match using a statistical model to analyze at least one of said events and states; and providing a recognized command based on said probable acoustic and statistical context matches.

* * * * *